United States Patent
Markovic

(10) Patent No.: US 12,166,322 B2
(45) Date of Patent: Dec. 10, 2024

(54) CARBON BRUSH FOR TRANSFERRING HIGH CURRENTS

(71) Applicant: SCHUNK KOHLENSTOFFTECHNIK GMBH, Heuchelheim (DE)

(72) Inventor: Milisav Markovic, Biebertal (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 0 days.

(21) Appl. No.: 17/716,310

(22) Filed: Apr. 8, 2022

(65) Prior Publication Data

US 2022/0329028 A1 Oct. 13, 2022

(30) Foreign Application Priority Data

Apr. 9, 2021 (EP) .................................... 21167573

(51) Int. Cl.
*H01R 39/38* (2006.01)
*H02K 13/10* (2006.01)
*H01R 39/26* (2006.01)

(52) U.S. Cl.
CPC .......... *H01R 39/388* (2013.01); *H02K 13/10* (2013.01); *H01R 39/26* (2013.01); *H01R 39/383* (2013.01)

(58) Field of Classification Search
CPC .... H01R 39/388; H01R 39/26; H01R 39/383; H01R 39/20; H02K 13/10
See application file for complete search history.

(56) References Cited

U.S. PATENT DOCUMENTS

| | | | | |
|---|---|---|---|---|
| 3,025,422 A | * | 3/1962 | Rusynyk | H01R 39/36 310/249 |
| 3,300,667 A | * | 1/1967 | Boes | F16C 33/04 508/108 |
| 5,168,620 A | * | 12/1992 | Denney | H01R 39/36 310/248 |
| 8,847,463 B2 | | 9/2014 | Neuweger et al. | |
| 2003/0190249 A1 | * | 10/2003 | Otani | H01R 39/22 419/10 |
| 2010/0133951 A1 | * | 6/2010 | Neuweger | H01R 39/20 310/249 |

FOREIGN PATENT DOCUMENTS

| | | |
|---|---|---|
| DE | 1215938 B | 5/1966 |
| DE | 102008059478 B4 | 6/2010 |
| EP | 1351348 A1 | 8/2003 |
| JP | S5727763 U | 2/1982 |

* cited by examiner

*Primary Examiner* — Terrance L Kenerly
*Assistant Examiner* — Viswanathan Subramanian
(74) *Attorney, Agent, or Firm* — Quarles & Brady LLP

(57) ABSTRACT

A carbon brush for transferring high currents having a connective piece for connecting an electric conductor and a consumable contact piece having a contact surface formed for abutting against a commutator element. The connective piece has a silver content of approximately 5% by weight to approximately 39% by weight and the contact piece has a silver content of approximately 40% by weight to 100% by weight.

6 Claims, 1 Drawing Sheet

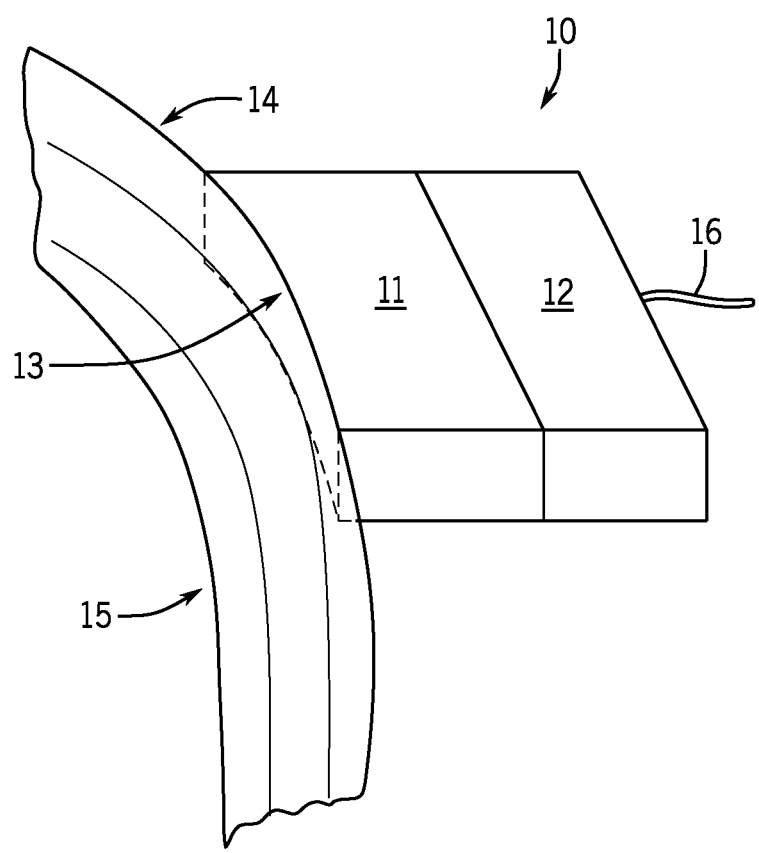

CARBON BRUSH FOR TRANSFERRING HIGH CURRENTS

This application claims priority to European Patent Application No. 21167573.1 filed Apr. 9, 2021, the contents of which are hereby incorporated by reference as if set forth in their entirety herein.

The disclosure relates to a carbon brush for transferring high currents having a connective piece for connecting an electric conductor and a consumable contact piece having a contact surface formed for abutting against a commutator element.

Carbon brushes of this kind are known from the state of the art and are used in particular in instances where high currents which are frequently higher than 20 A/cm$^2$ of the brush surface are transferred via carbon brushes. Carbon brushes of this kind are used in motors and generators, for example, the latter becoming more and more common in the area of wind energy plants.

Owing to the high transmitted power, it is important in the case of the mentioned carbon brushes to add metallic portions in sufficient amounts to the carbon, these metallic portions playing a role in realizing transmission resistances which are as small as possible so that the carbon brush heats up as little as possible because of the electric resistance. For this purpose, the carbon brushes produced as molds are commonly made of a mold particle composition of carbon and a metal (silver, for example). The carbon brushes known from the state of the art commonly have a silver content of more than 60%. This is tied to significant production costs.

The known carbon brushes are produced as essentially homogeneous molds which have a consistent composition both in their contact piece, which comes into contact with the slip ring element during operation, and in their connective piece, to which the electric connective conductor is connected. As a result, this leads to a significant portion of the silver which is in the carbon brush and is consumed in the contact piece in conjunction with the carbon brush during abrasion of the carbon brush being available in the connective piece where the specific material properties of the silver, which are required in interaction with the carbon in the contact piece, not being required. Indeed, the connective piece of the carbon brush serves for the production of an electrically conductive connection to the connective conductor. After the contact piece has been consumed, the connective piece is commonly disposed of together with the silver content therein.

Hence, DE 1 215 938 B, for example, discloses a carbon brush which is made essentially of silver and graphite. A silver content can be between 60% and 98%.

In order to overcome the set of problems mentioned above, DE 10 2008 059 478 B4 proposes a carbon brush which contains silver merely in the contact area. The connective piece of this brush no longer contains any silver. Rather, the silver in the connective piece was replaced with copper in this carbon brush. This significantly reduces the production costs.

However, the problem with this carbon brush having a connective piece which contains copper as its metal and a contact piece which contains silver is that copper also gets into the contact piece when producing this carbon brush, namely when pressing the two sections. Depending on how far the copper penetrates into the contact piece, copper gets on the commutator element, such as a slip ring, to be contacted when using this carbon brush. In this context in turn, an available patina is changed, which is disadvantageous. In particular the power transmission via a patina changed in this manner is not optimal.

The object of the disclosure at hand is to overcome the disadvantages of the known carbon brushes. The particular object of the disclosure is to make a carbon brush available which can be produced inexpensively and ensures good power transmission.

This object is attained according to the disclosure by a carbon brush of the kind mentioned above which is characterized by the connective piece having a silver content of approximately 5% by weight to approximately 39% by weight and the contact piece having a silver content of approximately 40% by weight to 100% by weight.

In the carbon brush according to the disclosure, both the connective piece and the contact piece have silver. However, the silver content in the connective piece is less than the silver content in the contact piece. In comparison to carbon brushes where the silver content is equally high in both the connective piece and the contact piece, a considerable amount of silver can be reduced in the carbon brush according to the disclosure. In contrast, the silver content in the contact piece is high which positively impacts the function of the carbon brush according to the disclosure. Owing to the fact that silver is also available as the metal in the connective area, the problem explained above of a disruption of a patina formation on the commutator element can be avoided entirely. However, the connective piece can still be connected and contains a solid structure owing to the silver content.

In a preferred embodiment of the carbon brush according to the disclosure, the connective piece has a silver content of approximately 15% by weight to 39% by weight. These ranges have proven to be particularly advantageous with regards to consistency and processibility.

Advantageously, the contact piece has a silver content of approximately 60% by weight to approximately 98% by weight. Such a silver content is particularly advantageous with regards to the power transmission occurring via the carbon brush.

Preferably, the carbon brush according to the disclosure is free of copper. This surely prevents the change of the patina on the commutator element as described above. No copper is visible on the contact piece of the carbon brush.

Preferably, a pigtail which is connected to the brush body via a plug connection, in particular via crimping or pressing, is provided in the connective piece.

As a rule, the connective piece and the contact piece are formed in a layer merging zone directed transversally to the abrasion direction of the carbon brush so as to merge with one another, and form a one-piece mold. As a rule, the connective piece and the contact piece essentially have the same length in an initial state. The "initial state" is understood to be the state in which the contact piece is still completely unused.

According to the disclosure, a method for transmitting high currents using a carbon brush according to the disclosure is further realizable.

Further features of the disclosure can be derived from the following description of a preferred exemplary embodiment of the disclosure in conjunction with the drawing and the dependent claims. In this context, the individual features can stand alone or be realized in combination with one another.

The FIGURE shows a schematic view of a carbon brush 10 according to the disclosure having a contact piece 11 and a connective piece 12. Both the contact piece and the connective piece are made of individual mold particles. In the initial state, pieces 11 and 12 are of the same length L.

Contact piece 11 abuts against a contact surface 14 of a commutator element 15 with a contact surface 13. The commutator element is a slip ring 15 in the exemplary embodiment at hand. Contact surface 13 of contact piece 11 is adapted to the shape of the outer circumference of slip ring 15, meaning contact surface 13 of contact piece 11 can snuggly abut against contact surface 14 of slip ring 15. On the free end of connective piece 12, a pigtail 16 is stamped into connective piece 12.

In carbon brush 10, contact piece 11 consists of a mixture of 90% by weight silver and 10% by weight carbon and is consumed in the direction of the pressing force which is indicated in the FIGURE by the arrow.

Connective piece 12 of brush 10 consists of a mixture of 20% by weight silver and 80% by weight carbon. The carbon of the connective piece and of the contact piece is available in the form of graphite.

Brush 10 is produced by means of a molding method during which carbon brush 10 is formed as a mold via suitable compression.

Carbon brush 10 is free of copper in the exemplary embodiment at hand. This prevents a patina from forming on slip ring 15.

The invention claimed is:

1. A carbon brush for transferring high currents having a connective piece for connecting an electric conductor, the connective piece comprising a free end configured for connection to an electrical conductor and an end opposing the free end abutting a consumable contact piece having a contact surface configured for abutting against a commutator element, wherein the connective piece comprises carbon and has a silver content of approximately 5% by weight to approximately 39% by weight and the contact piece has a silver content of approximately 40% by weight to 100% by weight, wherein the connective piece and the contact piece are essentially of the same length (L) in an initial state.

2. The carbon brush according to claim 1, wherein the connective piece has a silver content of approximately 10% by weight to approximately 39% by weight.

3. The carbon brush according to claim 2, wherein the connective piece has a silver content of approximately 15% by weight.

4. The carbon brush according to claim 1, wherein the contact piece has a silver content of approximately 80% by weight to approximately 98% by weight.

5. The carbon brush according to claim 1, wherein the carbon brush is free of copper.

6. The carbon brush according to claim 1, wherein the connective piece and the contact piece are formed in a layer merging zone directed transversally to the abrasion direction of the carbon brush so as to merge with one another, and form a one-piece mold.

* * * * *